(12) United States Patent
Yuan

(10) Patent No.: US 10,951,833 B2
(45) Date of Patent: Mar. 16, 2021

(54) METHOD AND DEVICE FOR SWITCHING BETWEEN CAMERAS, AND TERMINAL

(71) Applicant: GUANGDONG OPPO MOBILE TELECOMMUNICATIONS CORP., LTD., Guangdong (CN)

(72) Inventor: Quan Yuan, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 139 days.

(21) Appl. No.: 16/003,984

(22) Filed: Jun. 8, 2018

(65) Prior Publication Data
US 2019/0014270 A1 Jan. 10, 2019

(30) Foreign Application Priority Data
Jul. 10, 2017 (CN) .......................... 201710557982.8

(51) Int. Cl.
*H04N 5/247* (2006.01)
*H04N 5/232* (2006.01)
(Continued)

(52) U.S. Cl.
CPC .............. *H04N 5/247* (2013.01); *G06T 7/50* (2017.01); *H04N 5/2257* (2013.01);
(Continued)

(58) Field of Classification Search
CPC .... H04N 5/2252; H04N 5/2257; H04N 5/232; H04N 5/23212; H04N 5/23229;
(Continued)

(56) References Cited

U.S. PATENT DOCUMENTS

2007/0025714 A1* 2/2007 Shiraki ................. G03B 13/36
396/72
2016/0241793 A1* 8/2016 Ravirala ................ H04N 5/247
(Continued)

FOREIGN PATENT DOCUMENTS

CN 105959553 A 9/2016
CN 106254765 A 12/2016
(Continued)

OTHER PUBLICATIONS

Chinese Patent Application No. 201710557982.8, Office Action dated May 7, 2019, 8 pages.
(Continued)

*Primary Examiner* — Lin Ye
*Assistant Examiner* — Chriss S Yoder, III
(74) *Attorney, Agent, or Firm* — Lathrop GPM LLP

(57) ABSTRACT

The present disclosure provides a method and a device for switching between cameras and a terminal. When it is determined that a current zoom factor satisfies a first switching condition, a distance between a current object to be photographed and the camera and/or current illumination is obtained. It is determined whether the distance between the current object to be photographed and the camera and/or the current illumination satisfies a second switching condition. When the distance between the current object to be photographed and the camera and/or the current illumination satisfies the second switching condition, a switch is performed between the cameras.

15 Claims, 4 Drawing Sheets

(51) Int. Cl.
    *H04N 5/225*     (2006.01)
    *G06T 7/50*     (2017.01)
    *H04N 5/235*     (2006.01)
    *H04N 9/73*     (2006.01)

(52) U.S. Cl.
    CPC ....... *H04N 5/2351* (2013.01); *H04N 5/23229* (2013.01); *H04N 5/23296* (2013.01); *H04N 9/735* (2013.01); *H04N 5/2252* (2013.01); *H04N 5/23238* (2013.01)

(58) Field of Classification Search
    CPC ........... H04N 5/23238; H04N 5/23296; H04N 5/2351; H04N 5/2353; H04N 5/247; H04N 9/045; H04N 9/735; G06T 7/50
    See application file for complete search history.

(56) References Cited

U.S. PATENT DOCUMENTS

| | | | |
|---|---|---|---|
| 2017/0171442 A1 | 6/2017 | Spielberg | |
| 2017/0359494 A1* | 12/2017 | Zhou | H04N 5/232127 |
| 2018/0183982 A1* | 6/2018 | Lee | G02B 13/02 |
| 2018/0332223 A1* | 11/2018 | Lin | H04N 5/23241 |

FOREIGN PATENT DOCUMENTS

| | | |
|---|---|---|
| CN | 106375661 A | 2/2017 |
| CN | 106506957 A | 3/2017 |
| CN | 106791341 A | 5/2017 |
| CN | 106911892 A | 6/2017 |
| CN | 107277355 A | 10/2017 |
| JP | 2001215549 A | 8/2001 |
| JP | 2005215039 A | 8/2005 |
| JP | 2010119042 A | 5/2010 |
| JP | 2011055246 A | 3/2011 |

OTHER PUBLICATIONS

Chinese Patent Application No. 201710557982.8, English translation of Office Action dated May 7, 2019, 9 pages.
PCT/CN2018/094593 English Translation of the International Search Report and Written Opinion dated Jul. 5, 2018, 10 pp.
European Patent Application No. 18179461.1, Extended Search and Opinion dated Aug. 16, 2018, 7 pages.
European Patent Application No. 18179461.1, second Office Action dated Apr. 28, 2020, 6 pages.
Chinese Patent Application No. 201710557982.8, Rejection Decision dated Jun. 3, 2020, 5 pages.
Chinese Patent Application No. 201710557982.8, English translation of Rejection Decision dated Jun. 3, 2020, 7 pages.

* cited by examiner

METHOD AND DEVICE FOR SWITCHING BETWEEN CAMERAS, AND TERMINAL

CROSS-REFERENCE TO RELATED APPLICATIONS

This application is based on and claims priority of Chinese Patent Application No. 201710557982.8, filed on Jul. 10, 2017, the entire contents of which are incorporated herein by reference.

FIELD

The present disclosure relates to the imaging processing technology field, and more particularly to a method and a device for switching between cameras, and a terminal.

BACKGROUND

With development of terminal technology and semiconductor technology, setting cameras with different focal distances in a same terminal become a trend of terminal development. By setting the cameras with different focal distances in the same terminal, the terminal can capture a distant object without using a non-digital zoom, and an effect of zooming in the object is achieved.

At present, in order to ensure sharp images captured at different focal distances, the terminal switches between the cameras according to current zoom factor during use. For example, a wide-angle camera is used when the zoom factor is small, and it switches to use a telephoto camera when the zoom factor is large.

DISCLOSURE

The present disclosure provides a method for switching between cameras.

The present disclosure further provides a terminal.

The present disclosure further provides a non-transitory computer-readable storage medium.

Embodiments of the present disclosure provide a method for switching between cameras. The method for switching between cameras is applied in a terminal having at least two types of cameras. The method includes: when it is determined that a current zoom factor satisfies a first switching condition, obtaining a distance between a current object to be photographed and the camera and/or current illumination; determining whether the distance between the current object to be photographed and the camera and/or the current illumination satisfies a second switching condition; and when the distance between the current object to be photographed and the camera and/or the current illumination satisfies the second switching condition, controlling to switch between the cameras.

In addition, the present disclosure further provides a terminal. The terminal includes one or more of following components: a housing, at least two types of cameras, a processor, a memory, a power circuit, and a communication component. The cameras, the processor, the memory, the power circuit and the communication component are arranged in a space enclosed by the housing. The power circuit is configured to provide power for respective circuits or components of the terminal. The memory is configured to store executable program codes. The processor is configured to run a program corresponding to the executable program codes by reading the executable program codes stored in the memory to perform the method for switching between cameras according to above embodiments of the first aspect of the present disclosure.

In addition, the present disclosure further provides a non-transitory computer-readable storage medium. The computer-readable storage medium has stored therein instructions that, when executed by a processor of a terminal, causes the terminal to perform a method for switching between cameras. The method includes: when it is determined that a current zoom factor satisfies a first switching condition, obtaining a distance between a current object to be photographed and the camera and/or current illumination; determining whether the distance between the current object to be photographed and the camera and/or the current illumination satisfies a second switching condition; and when the distance between the current object to be photographed and the camera and/or the current illumination satisfies the second switching condition, controlling to switch between the cameras.

BRIEF DESCRIPTION OF THE DRAWINGS

These and other aspects and advantages of embodiments of the present disclosure will become apparent and more readily appreciated from the following descriptions made with reference to the drawings.

EMBODIMENTS OF THE PRESENT DISCLOSURE

Reference will now be made in detail to exemplary embodiments, examples of which are illustrated in the accompanying drawings, in which the same or similar reference numbers throughout the drawings represent the same or similar elements or elements having same or similar functions. Embodiments described below with reference to drawings are merely exemplary and used for explaining the present disclosure, and should not be understood as limitation to the present disclosure.

Embodiments of the present disclosure mainly aim to solve problems in the related art that focusing failure often occurs or a lot of noise points occur in the captured image when a terminal having at least two types of cameras performs switching between the cameras according to a zoom factor. For this, a method for switching between cameras is provided in the present disclosure. When it is determined that a current zoom factor satisfies a first switching condition, it is further determined whether a distance between a current object to be photographed and the camera and/or current illumination satisfies a second switching condition. When it is determined that the distance between the current object to be photographed and the camera and/or the current illumination satisfies the second switching condition, switching between the cameras is performed. Thus, a success rate of focusing after the switching between the cameras, a number of noise points in a captured image is reduced, photographing performance of a terminal is improved, effect of the captured image is improved, and user experience is improved.

In the following, a method and a device for switching between cameras, a terminal and a computer-readable storage medium according to embodiments of the present disclosure are illustrated with reference to the accompanying drawings.

Figure 1:
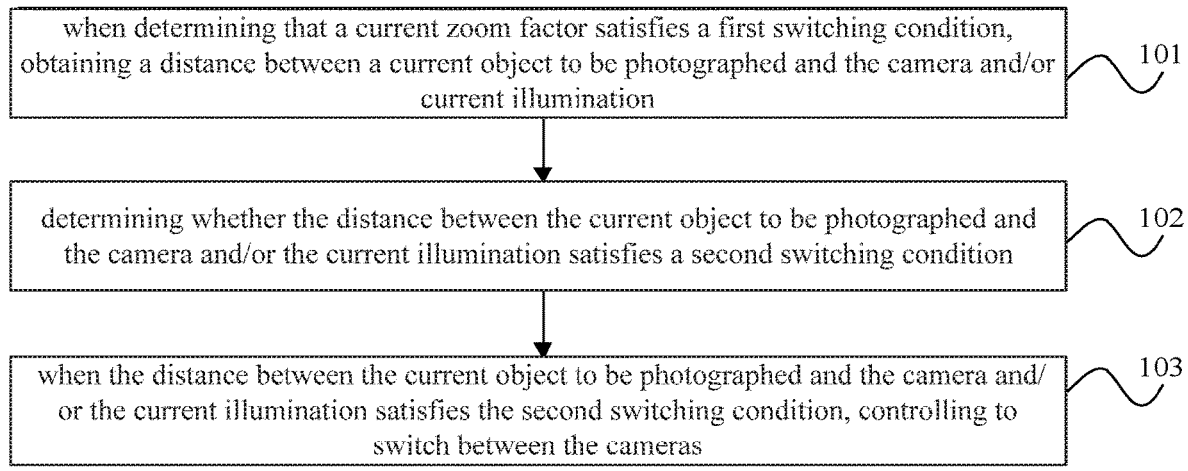
FIG. 1 is a flow chart of a method for switching between cameras according to an embodiment of the present disclosure.

FIG. 1 is a flow chart of a method for switching between cameras according to an embodiment of the present disclosure.

As illustrated in FIG. 1, the method includes the following.

At block 101, when it is determined that a current zoom factor satisfies a first switching condition, a distance between a current object to be photographed and the camera and/or current illumination is obtained.

At block 102, it is determined whether the distance between the current object to be photographed and the camera and/or the current illumination satisfies a second switching condition.

At block 103, when the distance between the current object to be photographed and the camera and/or the current illumination satisfies the second switching condition, a switch is performed between the cameras.

The method for switching between cameras provided in embodiments of the present disclosure may be implemented by a device for switching between cameras provided in embodiments of the present disclosure. The device may be configured in any terminal having at least two types of cameras, so as to control switching between the cameras in the terminal, thus preventing problems that focusing failure occurs after the switching between the cameras or a lot of noise points occurs in the captured image.

In detail, the distance between the current object to be photographed and the camera refers to a current object distance.

Different types of cameras have different requirements for object distance. For example, a long focus camera has a high requirement for the object distance and cannot focus when the object distance is small. Different types of cameras have different requirements for light due to different aperture sizes for different types of cameras. For example, the long focus camera has a high requirement for the light because the aperture size of the long focus camera is small. Based on above different requirements for object distance and light, embodiments of the present disclosure provide the following. When the zoom factor satisfies the first switching condition of the cameras, the current object distance and/or illumination is obtained, and then switching between the cameras is performed when the zoom factor, the object distance and/or illumination satisfies the second switching condition. Such that the success rate of focusing after switching between the cameras, noise points in the captured image is reduced, and effect of the captured image is improved.

In detailed implementation, the terminal may determine the current zoom factor in multiple ways as follows.

Example One

The current zoom factor is determined according to an obtained zoom instruction.

In detail, a zooming button may be set in the terminal. For example, focusing may be performed via a volume button in the terminal during photographing, or a button for focusing may be displayed in a photographing interface on the display of the terminal, thus a user may adjust the zoom factor via the zooming button or the button for focusing, and the device for switch between cameras may determine the zoom factor according to the obtained zoom instruction.

Example Two

The current zoom factor is determined according to an obtained image adjusting instruction.

In detail, it may be known according to principles of optical imaging that, an image size of a captured image relates to a focal distance and an object distance of the camera. That is, the image size relates to the focal distance when the object distance is unchanged. Therefore, in this embodiment, the user may adjust the zoom factor by adjusting the image size during photographing. That is, the device for switching between the cameras may determine the zoom factor according to the obtained image adjusting instruction.

After the device for switching between cameras determines the zoom factor, the device for switching between the cameras may further determine whether the zoom factor satisfy the first switching condition.

In detail, the terminal includes at least two types of cameras, therefore, when the device for switching between cameras determines whether the current zoom factor satisfies the first switching condition, it determines a type of a camera currently used. And then the device for switching between cameras determines whether the current zoom factor satisfies the first switching condition according to the type of the camera currently used. That is, the above step illustrated at block 101 includes follows.

A type of the camera currently used in the terminal is determined.

It is determined whether the current zoom factor satisfies the first switching condition according to the type of the camera currently used in the terminal and the current zoom factor.

For example, if a zoom factor of a wide-angle type camera is smaller than 2×zoom, and a zoom range of a telephoto camera is larger than 2×zoom. When the device for switching between cameras determines that the current zoom factor is 1.5×zoom and the camera current used is the wide-angle type, it may be determined that the current zoom factor does not satisfy the switching condition.

Further, the device for switching between cameras may obtain the distance between the current object to be photograph and the camera in many ways. For example, the device for switching between cameras may obtain the distance between the current object to be photograph and the camera using a distance sensor, or the device for switching between cameras may determine the distance between the current object to be photograph and the camera according to depth information of an image currently captured by the camera, etc., which is not limited herein.

In addition, the telephoto camera has higher requirement for light due to its smaller aperture size. That is, under same illumination, the telephoto camera has higher requirement for illumination. Therefore, in this embodiment, when it is determined that the zoom factor satisfies the first switching condition of the camera, it can be further determined whether the current illumination satisfies the second switching condition.

In detail, the obtained current illumination relates to attributes of the camera currently used, such as an aperture size, a sensitivity parameter of the camera. Therefore, when it is determined whether the current illumination satisfies the second switch condition, above parameters of a target camera corresponding to the current zoom factor. That is, the step illustrated at block 102 includes follows.

An aperture size, shutter time and a sensitivity parameter of the target camera are obtained.

It is determined whether the current illumination satisfies the second switching condition according to the aperture size, the shutter time and the sensitivity parameter of the target camera.

For example, the target camera determined according to the current zoom factor is a telephoto camera, and the camera currently used is a wide-angle camera. When the obtained current illumination is 100 lux, illumination that may be sensed under same illumination condition (i.e., the current illumination 100 lux) by the telephoto camera is calculated to be only 50 lux according to the aperture size, the shutter time and the sensitivity parameter of the telephoto camera. Illumination that the telephoto camera requires is at least 80 lux, then it may be determined that the current illumination does not satisfy the second switching condition, thus switching between the cameras may not be performed.

It should be noted that, in this embodiment, when it is determined that the zoom factor satisfies the first switching condition, whether the current object distance satisfies the second switching condition may only be determined, or whether the current illumination satisfies the second switching condition may only be determined, or whether both the current object distance and the current illumination satisfy the second switching condition may be determined, which is not limited herein.

With the method for switching between cameras provided in embodiments of the present disclosure, when it is determined that the current zoom factor satisfies the first switching condition, the distance between the current object to be photographed and the camera and/or the current illumination is obtained, then it is determined whether the distance between the current object to be photographed and the camera and/or the current illumination satisfies the second switching condition, when the distance between the current object to be photographed and the camera and/or the current illumination satisfies the second switching condition, switching between the cameras is performed. Therefore, the switching between the cameras is performed according to the zoom factor, the object distance and/or the current illumination, improving a success rate of focusing after switching between the cameras, reducing the number of noise points in the captured image, improving effect of the captured image, improving photographing performance of the terminal, and improving user experience.

It can be known from above analysis, for the terminal having different types of cameras, when the zoom factor satisfies the first switching condition of the camera, the current object distance and/or illumination may further be obtained, then it is determined whether the object distance and/or illumination satisfies the second switching condition. Only when the zoom factor satisfies the first switching condition and when the object distance and/or the illumination satisfies the second witching condition, switching between the cameras may be performed. In detailed implementation, after switching between the cameras is performed, in order to obtain well captured image, photographing parameters (such as a white balance gain value and the like) of the target camera may be adjusted. Therefore, in order to improve the speed of adjusting the photographing parameters of the target camera after switching between the cameras is performed, the photographing parameters of the target camera may be adjusted according to photographing parameters of the camera currently used.

In the following, above process will be described in detail with reference to FIG. 2.

Figure 2:
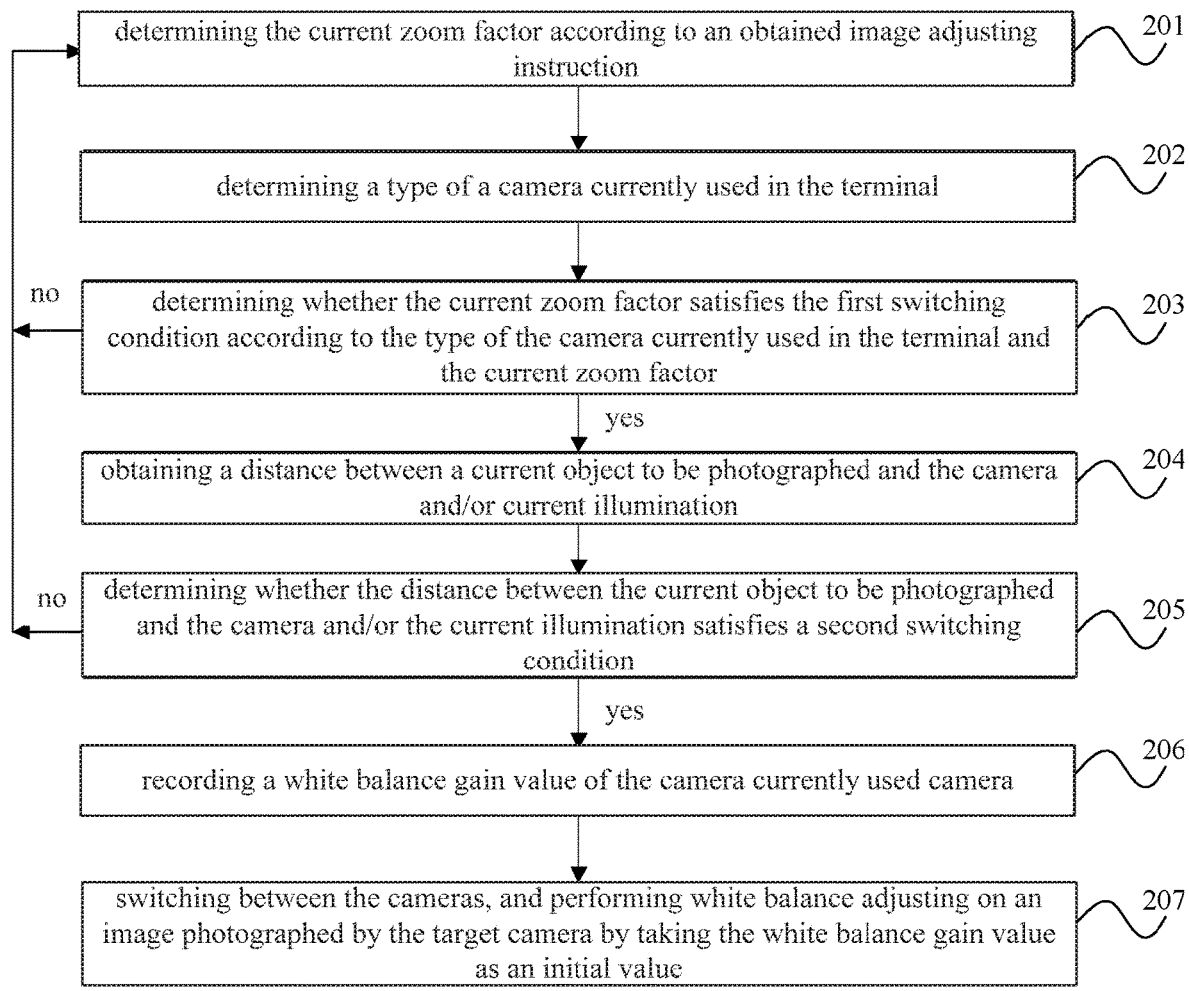
FIG. 2 is a flow chart of a method for switching between cameras according to another embodiment of the present disclosure.

FIG. 2 is a flow chart of a method for switching between cameras according to another embodiment of the present disclosure.

As illustrated in FIG. 2, the method for switching between cameras includes the following.

At block 201, the current zoom factor is determined according to an obtained image adjusting instruction.

At block 202, a type of a camera currently used in the terminal is determined.

At block 203, it is determined whether the current zoom factor satisfies the first switching condition according to the type of the camera currently used in the terminal and the current zoom factor. If the current zoom factor satisfies the first switching condition, the step illustrated at block 204 is performed, otherwise, return to perform the step illustrated at block 201.

At block 204, a distance between a current object to be photographed and the camera and/or current illumination is obtained.

At block 205, it is determined whether the distance between the current object to be photographed and the camera and/or the current illumination satisfies a second switching condition. If the distance between the current object to be photographed and the camera and/or the current illumination satisfies the second switching condition, the step illustrated at block 206 is performed, otherwise, return to perform the step illustrated at block 201.

At block 206, a white balance gain value of the camera currently used camera is recorded.

At block 207, switching between the cameras is performed, and white balance adjusting is performed on an image photographed by the target camera by taking the white balance gain value as an initial value.

In detail, in order to make the color of the captured image richer, the white balance of the image may generally be adjusted according to color temperature of the current image during photographing. Therefore, in some embodiments of the present disclosure, after it is determined that switching between cameras may be performed, the white balance gain value of the camera currently used camera is recorded, and then after switching between cameras is performed, the white balance adjusting on the image photographed by the target camera is performed by taking the white balance gain value as the initial value. The recorded white balance gain value is a gain value determined after the white balance adjusting is performed according to the color temperature of the captured image by the camera used before the switching, and the white balance gain value is generally suitable for color temperature of current image. Therefore, time for white balance adjusting may be shortened by taking the recorded white balance gain value and the initial value.

With the method for switching between cameras provided in embodiments of the present disclosure, when it is determined that the current zoom factor satisfies the first switching condition, the distance between the current object to be photographed and the camera and/or the current illumination is obtained, then it is determined whether the distance between the current object to be photographed and the camera and/or the current illumination satisfies the second switching condition, when the distance between the current object to be photographed and the camera and/or the current illumination satisfies the second switching condition, the white balance gain value of the camera currently used is recorded, and after switching between the cameras is performed, the white balance adjusting is performed by taking the white balance gain value as the initial value. Therefore, the switching between the cameras is performed according to the zoom factor, the object distance and/or the current illumination, improving a success rate of focusing after switching between the cameras, reducing the number of noise points in the captured image, improving effect of the captured image, improving photographing performance of the terminal, and improving user experience. In addition, by taking the white balance gain value of the camera used before the switching as the initial value of white balance of the camera after the switching, the time for white balance adjusting of the camera is shortened, and convergence speed of the white balance of the image is improved.

To achieve above embodiments, a device for switching between cameras is provided by embodiments of the present disclosure.

Figure 3:
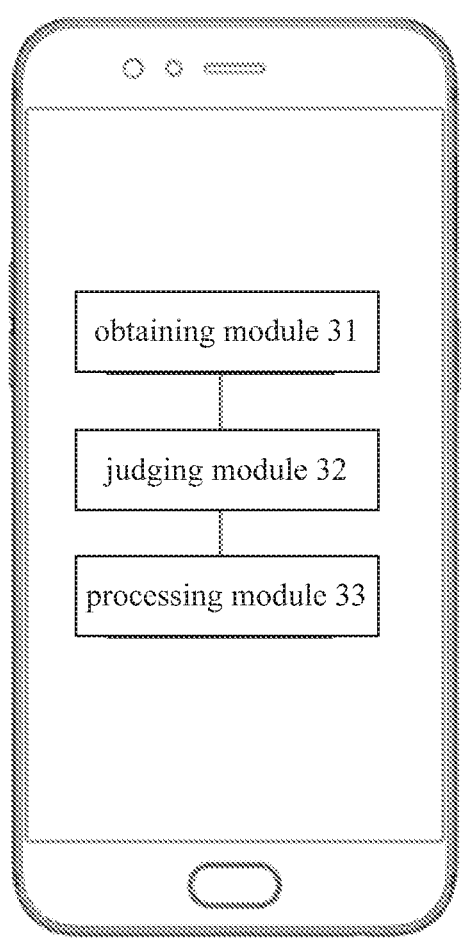
FIG. 3 is a block diagram illustrating a device for switching between cameras according to an embodiment of the present disclosure.

FIG. 3 is a block diagram illustrating a device for switching between cameras according to an embodiment of the present disclosure.

As illustrated in FIG. 3, the device for switching between cameras is applied in a terminal having at least two types of cameras. The device for switching between cameras includes an obtaining module 31, a judging module 32 and a processing module 33.

The obtaining module 31 is configured to, when it is determined that a current zoom factor satisfies a first camera switching condition, obtain a distance between a current object to be photographed and the camera and/or current illumination.

The judging module 32 is configured to determine whether the distance between the current object to be photographed and the camera and/or the current illumination satisfies a second switching condition.

The processing module 33 is configured to, when the distance between the current object to be photographed and the camera and/or the current illumination satisfies the second switching condition, control to switch between the cameras.

In detail, the device for switching between cameras may be configured in a terminal having at least two types of cameras, such that a switch may be performed between the cameras during using the terminal.

It should be noted that, detailed functions of respective modules in the device for switching between cameras provided in embodiments of the present disclosure and the process of switching between cameras may refer to the detailed description of the method for switching between cameras provided in above embodiments of the present disclosure, which is not elaborated herein.

With the device for switching between cameras provided in embodiments of the present disclosure, when it is determined that the current zoom factor satisfies the first switching condition, the distance between the current object to be photographed and the camera and/or the current illumination is obtained, then it is determined whether the distance between the current object to be photographed and the camera and/or the current illumination satisfies the second switching condition, when the distance between the current object to be photographed and the camera and/or the current illumination satisfies the second switching condition, switching between the cameras is performed. Therefore, the switching between the cameras is performed according to the zoom factor, the object distance and/or the current illumination, improving a success rate of focusing after switching between the cameras, reducing the number of noise points in the captured image, improving effect of the captured image, improving photographing performance of the terminal, and improving user experience.

Figure 4:
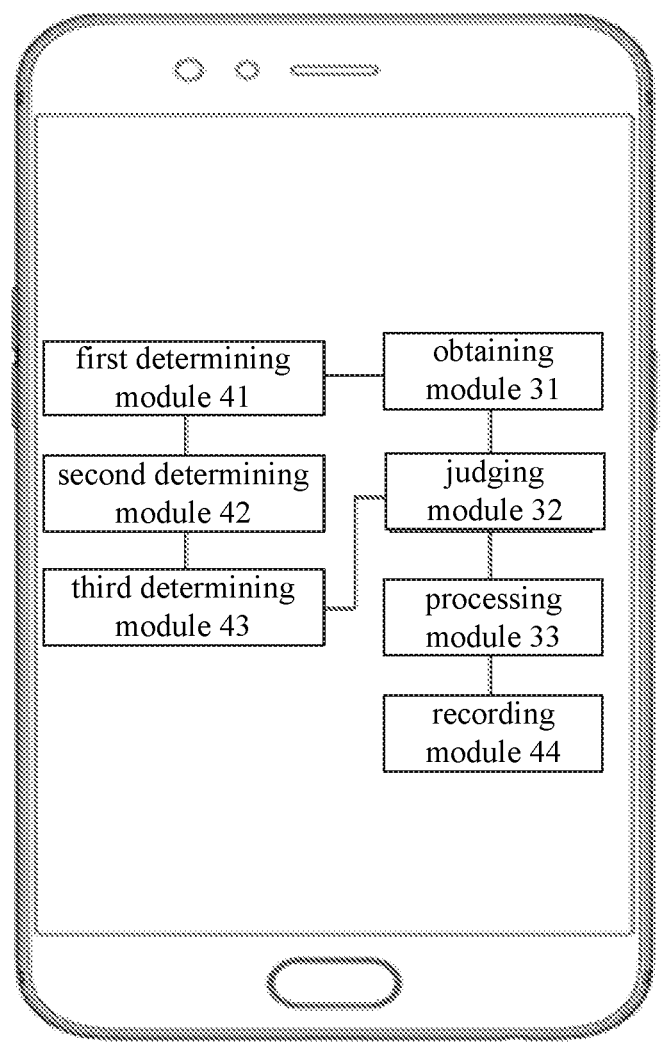
FIG. 4 is a block diagram illustrating a device for switching between cameras according to another embodiment of the present disclosure.

FIG. 4 is a block diagram illustrating a device for switching between cameras according to another embodiment of the present disclosure.

As illustrated in FIG. 4, based on the embodiment illustrated in FIG. 3, the device for switching between cameras further includes a first determining module 41.

The first determining module 41 is configured to determine the current zoom factor according to an obtained zooming instruction.

Alternatively, the first determining module 41 is configured to determine the current zoom factor according to an obtained image adjusting instruction.

Further, after the current zoom factor is determined, it may be further determined whether the current zoom factor satisfies the first switching condition according to a type of a camera currently used. That is, the device further includes a second determining module 42.

The second determining module 42 is configured to determine a type of a camera currently used in the terminal, and to determine whether the current zoom factor satisfies the first camera switching condition according to the type of the camera currently used in the terminal and the current zoom factor.

In addition, different illumination relates to multiple parameters of the camera, therefore, in some embodiments, the device further includes a third determining module 43.

The third determining module 43 is configured to determine a target camera according to the current zoom factor.

Correspondingly, the judging module 32 is configured to obtain an aperture size, shutter time and a sensitivity parameter of the target camera, and to determine whether the current illumination satisfies the second switching condition according to the aperture size, the shutter time and the sensitivity parameter of the target camera.

Further, in order to shorten time of white balance adjusting after switching between cameras, the device further includes a recording module.

The recording module is configured to record a white balance gain value of a camera currently used camera.

Correspondingly, the processing module 33 is further configured to perform the white balance adjusting on an image photographed by the target camera by taking the white balance gain value as an initial value.

It should be noted that, detailed functions of respective modules in the device for switching between cameras provided in embodiments of the present disclosure and the process of switching between cameras may refer to the detailed description of the method for switching between cameras provided in above embodiments of the present disclosure, which is not elaborated herein.

With the device for switching between cameras provided in embodiments of the present disclosure, when it is determined that the current zoom factor satisfies the first switching condition, the distance between the current object to be photographed and the camera and/or the current illumination is obtained, then it is determined whether the distance between the current object to be photographed and the camera and/or the current illumination satisfies the second switching condition, when the distance between the current object to be photographed and the camera and/or the current illumination satisfies the second switching condition, the white balance gain value of the camera currently used is recorded, and after switching between the cameras is performed, the white balance adjusting is performed by taking the white balance gain value as the initial value. Therefore, the switching between the cameras is performed according to the zoom factor, the object distance and/or the current illumination, improving a success rate of focusing after switching between the cameras, reducing the number of noise points in the captured image, improving effect of the captured image, improving photographing performance of the terminal, and improving user experience. In addition, by taking the white balance gain value of the camera used before the switching as the initial value of white balance of the camera after the switching, the time for white balance adjusting of the camera is shortened, and convergence speed of the white balance of the image is improved.

Figure 5:
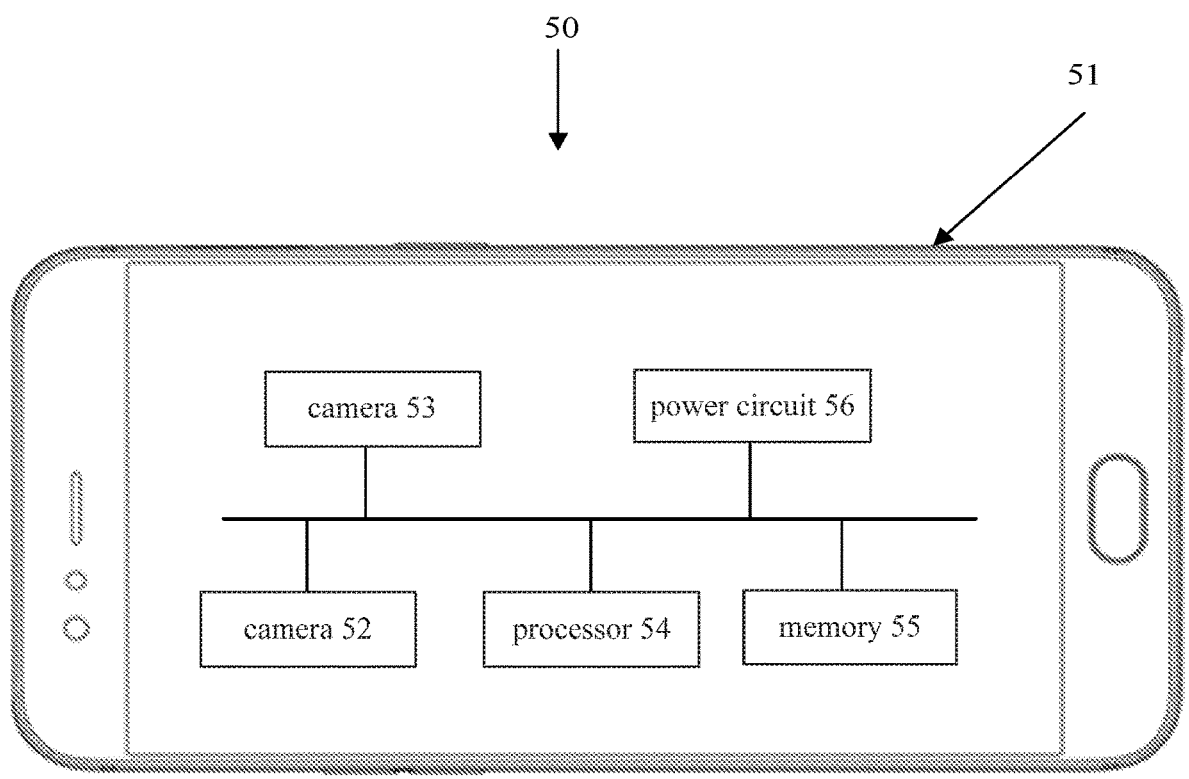
FIG. 5 is a block diagram illustrating a terminal according to an embodiment of the present disclosure.

FIG. 5 is a block diagram illustrating a terminal according to an embodiment of the present disclosure.

As illustrated in FIG. 5, the terminal 50 includes one or more of following components: a housing 51, at least two types of cameras 52 and 53, a processor 54, a memory 55, a power circuit 56. The at least two types of cameras 52 and 53, the processor 53, the memory 54, the power circuit 56 are arranged in a space enclosed by the housing 51. The power circuit 56 is configured to provide power for respective circuits or components of the terminal 50. The memory 55 is configured to store executable program codes. The processor 54 is configured to run a program corresponding to the executable program codes by reading the executable program codes stored in the memory 54 to perform the method for switching between cameras provided in above embodiments.

It should be noted that, foregoing description of embodiments of the method for switching between cameras may be applied to the terminal according to embodiments of the present disclosure. The implementation principles thereof are similar, and details are not described herein again.

With the terminal provided in embodiments of the present disclosure, when it is determined that the current zoom factor satisfies the first switching condition, the distance between the current object to be photographed and the camera and/or the current illumination is obtained, then it is determined whether the distance between the current object to be photographed and the camera and/or the current illumination satisfies the second switching condition, when the distance between the current object to be photographed and the camera and/or the current illumination satisfies the second switching condition, switching between the cameras is performed. Therefore, the switching between the cameras is performed according to the zoom factor, the object distance and/or the current illumination, improving a success rate of focusing after switching between the cameras, reducing the number of noise points in the captured image, improving effect of the captured image, improving photographing performance of the terminal, and improving user experience.

Further, embodiments of the present disclosure provide a computer-readable storage medium. The computer-readable storage medium has stored therein one or more programs. When the one or more programs is performed by a terminal, the terminal is caused to perform the method for switching between cameras according to any one of the above embodiments.

The storage medium may adopt any combination of one or more computer readable media. The computer readable medium may be a computer readable signal medium or a computer readable storage medium. The computer readable storage medium may be, but is not limited to, for example, an electrical, magnetic, optical, electromagnetic, infrared, or semiconductor system, apparatus, device, component or any combination thereof. A specific example of the computer readable storage media include (a non-exhaustive list): an electrical connection having one or more wires, a portable computer disk, a hard disk, a random access memory (RAM), a read only memory (ROM), an Erasable Programmable Read Only Memory (EPROM) or a flash memory, an optical fiber, a compact disc read-only memory (CD-ROM), an optical memory component, a magnetic memory component, or any suitable combination thereof. In context, the computer readable storage medium may be any tangible medium including or storing programs. The programs may be used by an instruction executed system, apparatus or device, or a connection thereof.

The computer readable signal medium may include a data signal propagating in baseband or as part of a carrier which carries computer readable program codes. Such propagated data signal may be in many forms, including but not limited to an electromagnetic signal, an optical signal, or any suitable combination thereof. The computer readable signal medium may also be any computer readable medium other than the computer readable storage medium, which may send, propagate, or transport programs used by an instruction executed system, apparatus or device, or a connection thereof.

The program code stored on the computer readable medium may be transmitted using any appropriate medium, including but not limited to wireless, wireline, optical fiber cable, RF, or any suitable combination thereof.

The computer program code for carrying out operations of embodiments of the present disclosure may be written in one or more programming languages. The programming language includes an object oriented programming language, such as Java, Smalltalk, C ++, as well as conventional procedural programming language, such as "C" language or similar programming language. The program code may be executed entirely on a user's computer, partly on the user's computer, as a separate software package, partly on the user's computer, partly on a remote computer, or entirely on the remote computer or server. In a case of the remote computer, the remote computer may be connected to the user's computer or an external computer (such as using an Internet service provider to connect over the Internet) through any kind of network, including a Local Area Network (hereafter referred as to LAN) or a Wide Area Network (hereafter referred as to WAN).

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples. In addition, those skilled in the art may combine different embodiments or examples described in this specification and features of different embodiments or examples without confliction with each other.

In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means two or more than two, such as two, three, or the like, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

In this specification, "computer readable storage medium" can be any means that can contain, store, communicate, propagate, or transport the program for use by the instruction execution system, apparatus, or device, or in conjunction with the instruction execution system, apparatus, or device. A specific example of the computer readable storage media include (a non-exhaustive list): an electrical connection having one or more wires, a portable computer disk, a hard disk, a random access memory (RAM), a read only memory (ROM), an Erasable Programmable Read Only Memory (EPROM) or a flash memory, an optical fiber, a compact disc read-only memory (CD-ROM), an optical memory component, a magnetic memory component, or any suitable combination thereof. In addition, the computer-readable medium may even be paper or other suitable medium on which the program can be printed, because the paper or other suitable medium can be scanned optically, then processed by editing, interpretation, or other suitable methods if necessary to obtain the program electronically and then storing it in computer memory.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc.

Although explanatory embodiments have been shown and described, it would be appreciated by those skilled in the art that the above embodiments are exemplary and cannot be construed to limit the present disclosure, and changes, alternatives, and modifications can be made by those skilled in the art in the embodiments without departing from the scope of the present disclosure.

What is claimed is:

1. A method for switching between cameras, applied in a terminal having at least a first camera and a second camera, comprising:
   when the first camera is currently used and it is determined that a current zoom factor satisfies a first switching condition for switching the first camera to the second camera, obtaining current illumination via the first camera currently used;
   under a same illumination condition to that of the current illumination obtained by the first camera, calculating illumination sensed by the second camera based on an aperture size of the second camera, a shutter time of the second camera and a sensitivity parameter of the second camera;
   determining whether the illuminance sensed by the second camera is greater than illumination required by the second camera; and
   when the illuminance sensed by the second camera is greater than the illumination required by the second camera, switching from the first camera to the second camera.

2. The method according to claim 1, before it is determined that the current zoom factor satisfies the first switching condition, further comprising:
   determining the current zoom factor according to an obtained zooming instruction; or
   determining the current zoom factor according to an obtained image adjusting instruction.

3. The method according to claim 1, before it is determined that the current zoom factor satisfies the first switching condition, further comprising:
   determining a type of a camera currently used in the terminal; and
   determining whether the current zoom factor satisfies the first switching condition according to the type of the camera currently used in the terminal and the current zoom factor.

4. The method according to claim 1, before switching from the first camera to the second camera, further comprising:
   recording a white balance gain value of the first camera; and
   after switching from the first camera to the second camera, further comprising:
   performing white balance adjusting on an image photographed by the second camera by taking the white balance gain value as an initial value.

5. The method according to claim 1, further comprising:
   determining a distance between a current object to be photographed and the cameras; and
   determining whether the distance between the current object to be photographed and the cameras satisfies a second switching condition for switching between the first camera and the second camera;

when the distance between the current object to be photographed and the cameras satisfies the second switching condition for switching between the first camera and the second camera, controlling to switch between the first camera and the second camera.

6. A terminal, comprising: one or more of following components: a housing, at least a first camera and a second camera, a processor, a memory, a power circuit, and a communication component, wherein the cameras, the processor, the memory, the power circuit and the communication component are arranged in a space enclosed by the housing; the power circuit is configured to provide power for respective circuits or components of the terminal; the memory is configured to store executable program codes; the processor is configured to run a program corresponding to the executable program codes by reading the executable program codes stored in the memory, to perform following operations:

when the first camera is currently used and it is determined that a current zoom factor satisfies a first switching condition for switching the first camera to the second camera, obtaining current illumination via the first camera currently used;

under a same illumination condition to that of the current illumination obtained by the first camera, calculating illumination sensed by the second camera based on an aperture size of the second camera, a shutter time of the second camera and a sensitivity parameter of the second camera;

determining whether the illuminance sensed by the second camera is greater than illumination required by the second camera; and when the illuminance sensed by the second camera is greater than the illumination required by the second camera, switching from the first camera to the second camera.

7. The terminal according to claim 6, the processor is configured to perform:

determining the current zoom factor according to an obtained zooming instruction; or determining the current zoom factor according to an obtained image adjusting instruction.

8. The terminal according to claim 6, the processor is configured to perform:

determining a type of a camera currently used in the terminal; and determining whether the current zoom factor satisfies the first switching condition according to the type of the camera currently used in the terminal and the current zoom factor.

9. The terminal according to claim 6, the processor is configured to perform:

recording a white balance gain value of a camera currently used camera; and after controlling to switch between the cameras, the method further comprising:

performing white balance adjusting on an image photographed by the target camera by taking the white balance gain value as an initial value.

10. The terminal according to claim 6, wherein the processor is further configured to perform:

determining a distance between a current object to be photographed and the cameras; and determining whether the distance between the current object to be photographed and the cameras satisfies a second switching condition for switching between the first camera and the second camera;

when the distance between the current object to be photographed and the cameras satisfies the second switching condition for switching between the first camera and the second camera, controlling to switch between the first camera and the second camera.

11. A non-transitory computer-readable storage medium having stored therein instructions that, when executed by a processor of a terminal, causes the terminal to perform a method for switching between cameras, the method comprising:

when a first camera is currently used and it is determined that a current zoom factor satisfies a first switching condition for switching the first camera to the second camera, obtaining current illumination via the first camera currently used;

under a same illumination condition to that of the current illumination obtained by the first camera, calculating illumination sensed by the second camera based on an aperture size of the second camera, a shutter time of the second camera and a sensitivity parameter of the second camera;

determining whether the illuminance sensed by the second camera is greater than illumination required by the second camera; and when the illuminance sensed by the second camera is greater than the illumination required by the second camera, switching from the first camera to the second camera.

12. The storage medium according to claim 11, before it is determined that the current zoom factor satisfies the first switching condition, the method further comprising:

determining the current zoom factor according to an obtained zooming instruction; or determining the current zoom factor according to an obtained image adjusting instruction.

13. The storage medium according to claim 11, before it is determined that the current zoom factor satisfies the first switching condition, the method further comprising:

determining a type of a camera currently used in the terminal; and determining whether the current zoom factor satisfies the first switching condition according to the type of the camera currently used in the terminal and the current zoom factor.

14. The storage medium according to claim 11, before switching from the first camera to the second camera, the method further comprising:

recording a white balance gain value of the first camera; and after switching from the first camera to the second camera, further comprising:

performing white balance adjusting on an image photographed by the second camera by taking the white balance gain value as an initial value.

15. The storage medium according to claim 11, wherein the method further comprises:

determining a distance between a current object to be photographed and the cameras; and determining whether the distance between the current object to be photographed and the cameras satisfies a second switching condition for switching between the first camera and the second camera;

when the distance between the current object to be photographed and the cameras satisfies the second switching condition for switching between the first camera and the second camera, controlling to switch between the first camera and the second camera.

\* \* \* \* \*